US007327217B2

(12) United States Patent
Carter et al.

(10) Patent No.: US 7,327,217 B2
(45) Date of Patent: Feb. 5, 2008

(54) SECURITY METHODS, SYSTEMS AND ARTICLES OF MANUFACTURE

(75) Inventors: David B. Carter, Greensboro, NC (US); Randy Carr, Miami, FL (US)

(73) Assignee: G&K Services, Inc., Minnetonka, MN (US)

( * ) Notice: Subject to any disclaimer, the term of this patent is extended or adjusted under 35 U.S.C. 154(b) by 306 days.

(21) Appl. No.: 10/350,281

(22) Filed: Jan. 23, 2003

(65) Prior Publication Data

US 2005/0024183 A1 Feb. 3, 2005

(51) Int. Cl.
*G05B 19/00* (2006.01)
*G06F 7/00* (2006.01)
*G08B 29/00* (2006.01)
*H04B 1/00* (2006.01)
*H04Q 1/00* (2006.01)

(52) U.S. Cl. ............... 340/5.61; 340/10.1; 340/825.49; 24/3.1; 40/2.2

(58) Field of Classification Search ............... 340/5.61, 340/10.1, 825.49; 40/1.5, 2.2; 24/3.1, 3.5, 24/3.11; 156/257; 235/382, 487; 238/72–75; 282/77, 70; 8/445, 636
See application file for complete search history.

(56) References Cited

U.S. PATENT DOCUMENTS 2,712,514 A * 7/1955 English, Jr. ................. 156/281
3,533,176 A * 10/1970 Hogstrom et al. ............ 283/92
4,098,014 A * 7/1978 Lauer et al. .................. 40/1.5
4,773,677 A * 9/1988 Plasse ......................... 283/77
4,961,275 A * 10/1990 Klein ........................... 40/1.5
5,302,438 A * 4/1994 Komamura et al. ..... 428/195.1
5,635,012 A * 6/1997 Belluci et al. ............. 156/277
5,681,259 A * 10/1997 August ........................ 600/27
5,785,181 A * 7/1998 Quartararo, Jr. ............. 209/3.3
5,873,606 A * 2/1999 Haas et al. ................... 283/75
RE37,531 E * 1/2002 Chaco et al. ................. 379/38
6,367,178 B1 * 4/2002 Chmiel ......................... 40/1.5
6,426,701 B1 * 7/2002 Levy et al. ............. 340/573.1
6,441,736 B1 * 8/2002 Leighton ................ 340/572.1
6,585,845 B1 * 7/2003 Peterson ..................... 156/257
6,663,005 B2 * 12/2003 Tischer .................. 235/462.01
6,702,185 B1 * 3/2004 Zercher ...................... 235/488
6,752,430 B2 * 6/2004 Holt et al. .................... 283/72
6,817,530 B2 * 11/2004 Labrec et al. ............... 235/487
6,832,832 B2 * 12/2004 Martin et al. ............... 347/103
7,063,264 B2 * 6/2006 Bi et al. ..................... 235/487

* cited by examiner

*Primary Examiner*—Brian Zimmerman
*Assistant Examiner*—Nam Nguyen

(57) ABSTRACT

An identification badge is shown and includes a washable worker identification badge including a photograph of a worker using the garment, wherein an image from the photograph is sublimated or printed on the badge. In one embodiment the badge includes a security device providing radio frequency identification capabilities. According to another embodiment, a garment with a washable worker identification badge is provided. In still other embodiments, a security system and procedure is provided using the badges or garments.

10 Claims, 7 Drawing Sheets

400
402
404

202′
216
APPLE
Lucy Albert
22145

RECEIVER DEVICES
504
CONTROL SYSTEM
506
502
500
508
510
202'
216

SECURITY METHODS, SYSTEMS AND ARTICLES OF MANUFACTURE

TECHNICAL FIELD OF THE INVENTION

This invention pertains generally to the fields of identification, security and garments, and more specifically to identification badges, security emblems and security devices for use with washable garments.

BACKGROUND OF THE INVENTION

Maintaining security in school, business, industrial and other facilities continues to be of utmost importance. In addition, home security is also of utmost importance. Most security procedures and systems for facilities include the use of an identification badge that is carried by a user and presented in order to gain entry to a facility, and usually also worn while in the facility to signify to others that the wearer has a legitimate right to be there. These identification badges typically include a clip that can be used to clip the badge to a wearer's clothing, or a necklace that can be used to hang the badge around a user's neck.

In the area of home security, many companies provide their employees with a company jacket or shirt that includes a logo. A homeowner or occupant can therefore determine whether or not to allow access to their home or apartment based on the garment and its logo or identification information.

While such identification badges function well in many settings such as in an office, they have certain attributes that can present a problem in other settings. For example, users must keep the badges in a safe place and make sure they have them available whenever they need to gain access to a facility. Also, in certain working environments, a badge worn on the outside of a user's clothing may present a safety or manufacturing hazard. For instance, a badge hanging from a user's neck may get entangled in manufacturing equipment, potentially resulting in injury to a user. Or, in sanitary environments, the badge may harbor or carry unwanted germs that could get transferred to a sanitary food or other sanitary surface, causing unwanted contamination. Still further, such a badge may carry contaminants that might, for instance, foul a "clean room" environment such as a semiconductor manufacturing facility.

As such, there is a need for identification badges that can eliminate or alleviate some of these disadvantages.

DETAILED DESCRIPTION OF THE INVENTION

In the following detailed description of the embodiments, reference is made to the accompanying drawings, which form a part hereof, and in which is shown by way of illustration, but not limitation, specific embodiments of the invention that may be practiced. These embodiments are described in sufficient detail to enable one of ordinary skill in the art to understand and implement them, and it is to be understood that other embodiments may be utilized and that structural and methodological changes may be made without departing from the spirit and scope of the present disclosure. The following detailed description is, therefore, not to be taken in a limiting sense, and the scope of the embodiments of the inventions disclosed herein is defined only by the appended claims.

Figure 1:
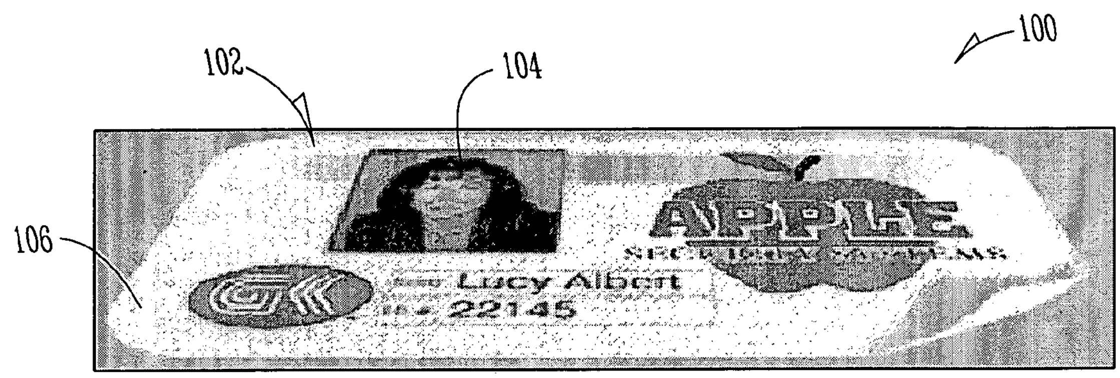
FIG. 1 illustrates a various embodiments of an identification badge according to the present invention.

Referring now to FIG. 1, there is illustrated a first embodiment 100 of the invention. An identification badge is formed as a washable worker identification badge 102 including a photograph 104 of a person intended to wear the garment, wherein the photograph 104 is sublimated or printed on a substrate 106 of the badge 102 with an indelible or colorfast colorant, in one example embodiment ink. According to one example embodiment, the photograph 104 is sufficiently detailed to allow accurate identification of the person wearing the badge by comparing the worker's face to the photograph. According to one example embodiment, substrate 106 is formed of a woven, non-woven or knitted fabric or any other washable material such as mylar.

Figure 2A:
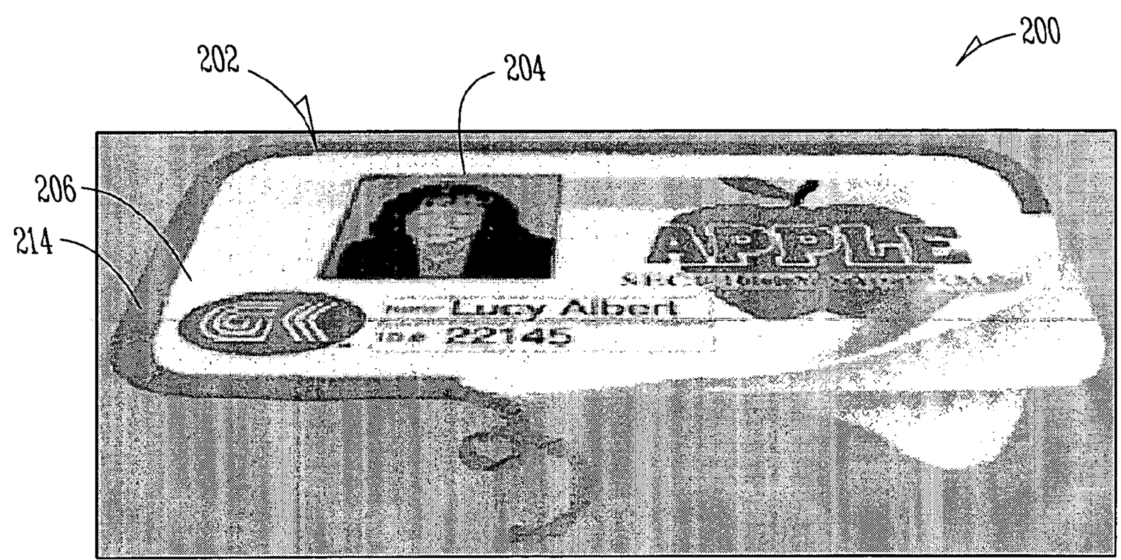
FIGS. 2A, 2B and 2C illustrates various alternate embodiments of an identification badge according to the present invention.
Figures 2B, 2C:
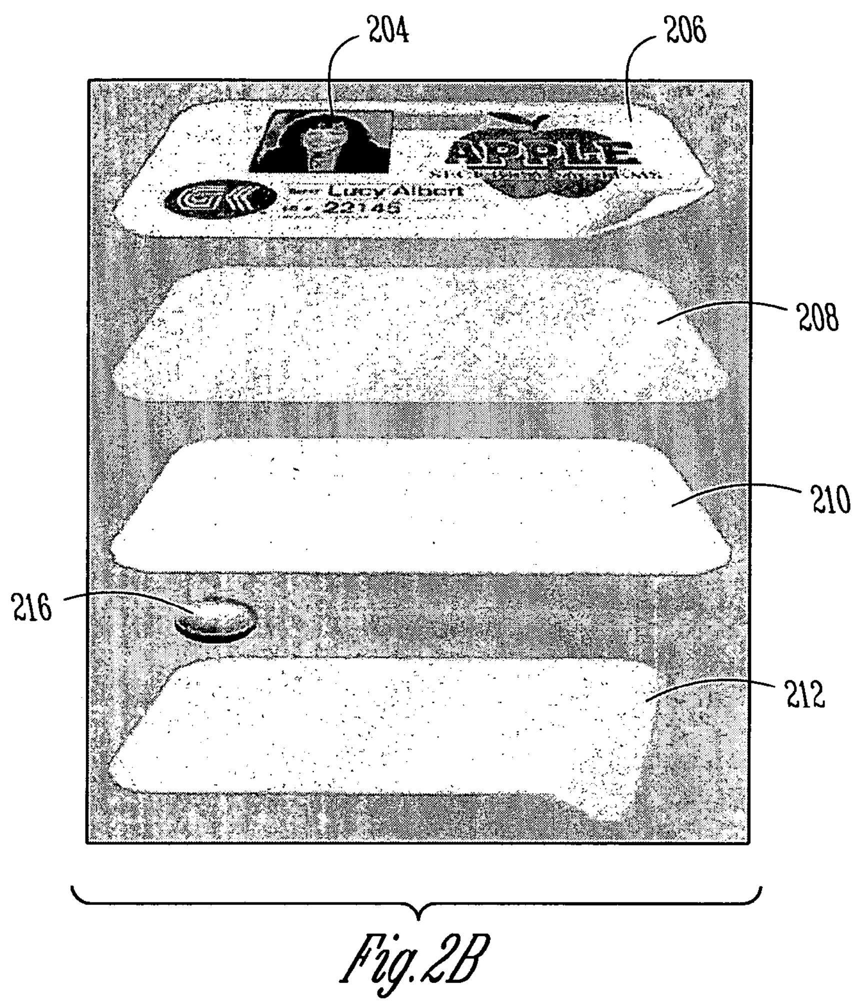

Referring now to FIGS. 2A, 2B and 2C, there is illustrated yet another embodiment 200 of the invention in which worker identification badge 202 includes a photograph 204 of a person intended to wear the garment sublimated or printed on a substrate 206 of the badge 202. According to one example embodiment, substrate 206, like substrate 106, is alternately formed of a woven, non-woven or knitted fabric.

According to one example embodiment, a non-woven fabric element 210, for example a pellon member, is fused or bonded to substrate 206 with a polyurethane layer/element 208, for example 3 mils thick. Non-woven element 210 serves to strengthen and reinforce substrate 206 and increase durability. According to one example embodiment, substrate 206, polyurethane element 208, and non-woven element 210 are assembled from respective rolls or webs in a continuous manufacturing process, with one or more opposing heated roller members compressing and heating the webs together in order to bond substrate 206 to backing element 210.

According to yet another alternate embodiment, an additional polyurethane element or layer 212, for example 5 mils thick, is further bonded on the "bottom" of non-woven fabric element 210, to help seal the "bottom" of the badge, and to protect the substrate from washing agents on its "bottom" side during washing of the badge. Layer 212 may be bonded on the bottom side of the non-woven backing element 210 using, for example, the same manufacturing process described above wherein the polyurethane is heated and pressed to the element 210 to cause the element 212 to bond to element 210. As also shown in FIG. 2A, the fully assembled badge 202 includes a merrow border 214 sewn around the perimeter of elements 206, 208, 210 and 212.

According to still another example embodiment, a security device 216 is inserted between non-woven element 210 and polyurethane element 212 during manufacturing, such that the assembled badge 202', shown in FIG. 2C, includes the security device 216 secured within the badge 202'. Security device may be, for instance, a radio frequency identification device (RFID). In one embodiment, the RFID is sealed in a pocket within the badge 202'. In one embodiment, the pocket within the badge is created from a polyurethane material. In some examples, the RFID is sealed n the pocket in a manner that allows the RFID to be removed and reused if the badge 202' is disposed of or no longer used.

Figure 3A:
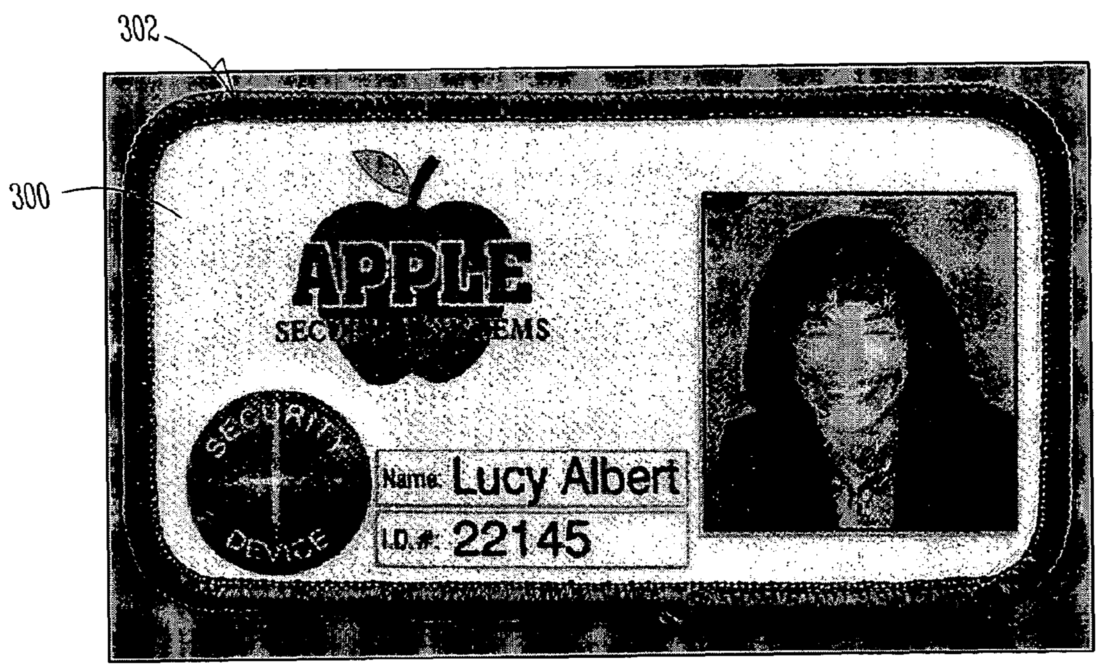
FIGS. 3A and 3B illustrate yet other alternate embodiments of indicia on the substrate of a badge.
Figure 3B:
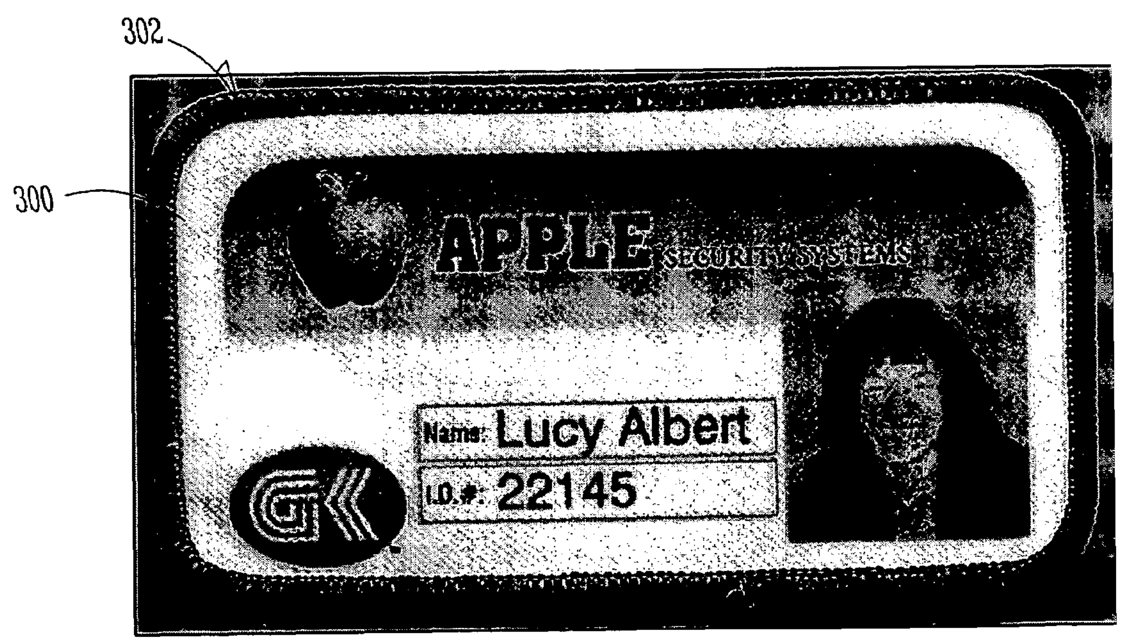

According to one example embodiment, the photograph 104 or 204 is sufficiently finely detailed to allow accurate identification of the person wearing the badge by comparing the worker's face to the photograph. Further, according to other example embodiments, such as that illustrated in FIGS. 3A and 3B, a substrate 300 such as substrate 106 or 206 further includes additional information or indicia 302, such as a worker's name, company or institutional names, photographs, logos or images, barcodes, serial numbers or other information that may be desired to place on the substrate.

According to one example embodiment, the substrates 106 or 206 are formed of a 100% polyester (or a suitable substitute) fabric and the worker's photograph and any other desirable indicia 302 is sublimated on the fabric. According to this example embodiment, ink or a suitable type is sublimated into the polyester (wherein for instance the polyester fibers are heated during the sublimation process to open their pores and the ink vapor is trapped and encapsulated in the fiber when the fibers cool).

According to another example embodiment, screen-printing or another printing process is used to print the photograph and other indicia 302 on the substrate. In such embodiments wash resistant, colorfast and/or indelible ink is preferred. In still another example embodiment, certain indicia 302 may in addition be embroidered on the substrate 106 or 206. Or, in other example embodiments combinations of the above may be used. For example, a substrate 106 or 206 may include a sublimated photo of the wearer, an embroidered logo of the company and a printed serial number or bar code. According to yet another example embodiment, the photograph or indicia may be weaved into the substrate 106 or 206, for example using an automated weaving machine.

According to one example embodiment, substrate 106 or 206 is formed of 100% or less than 100% polyester woven fabric as noted above, for example a woven twill. A 100% polyester fabric or an equivalent is most desirable for the sublimation of images and indicia as described above. Substrate 106 or 206, in another example embodiment, is a washable canvas or sheeting or duck fabric. Such materials, as well as polyester, are suitable for screen printing or embroidering. Non-woven element 210 may be formed of mechanical or chemical means, for example as pellon materials.

Figure 4:
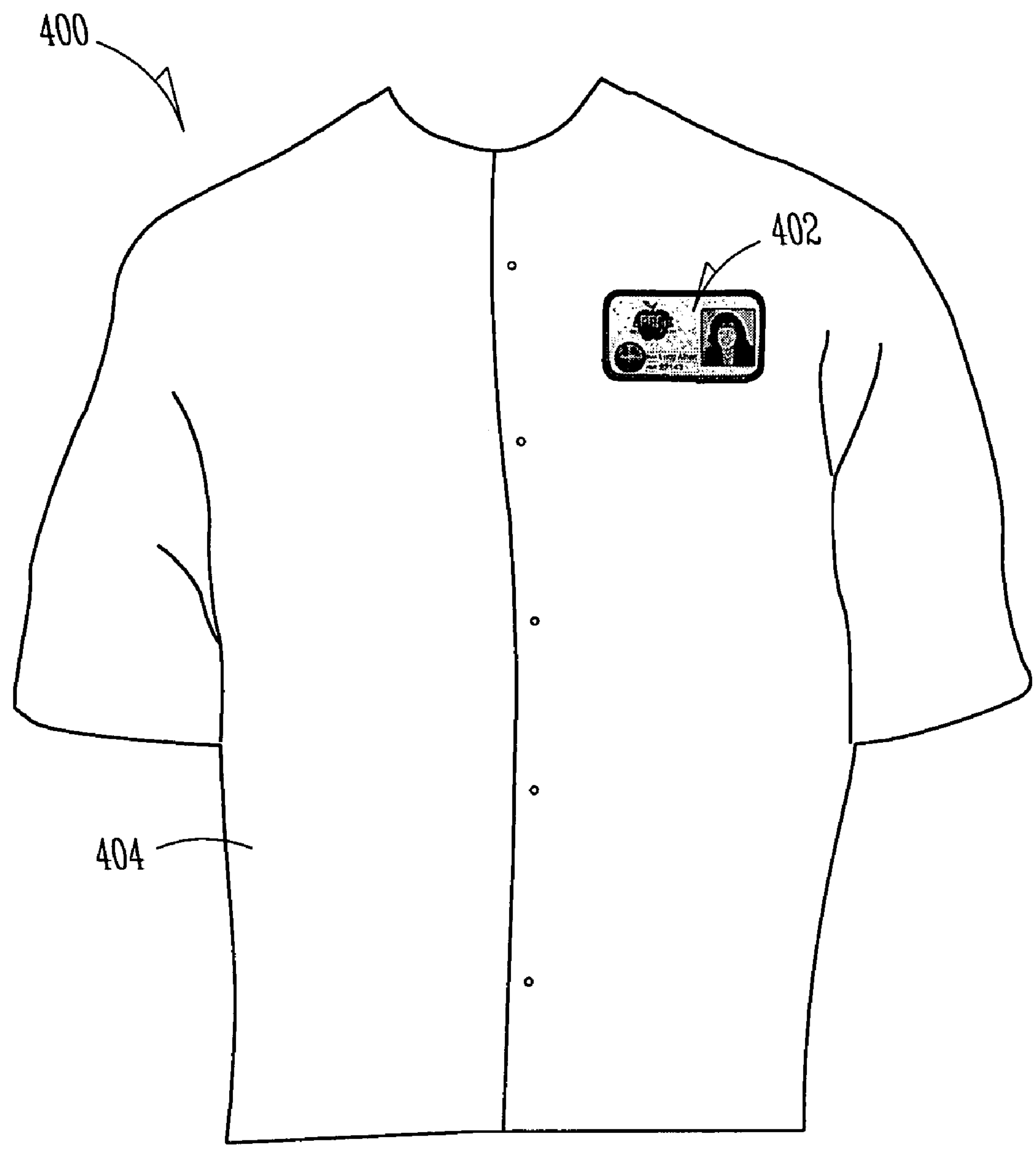
FIG. 4 illustrates alternate embodiments of the invention wherein a garment is provided with an identification badge.

Referring now to FIG. 4, there is illustrated a first embodiment of a garment 400 according to the present invention. Garment 400 includes an identification badge in the form of a washable worker identification badge 402 as formed in any of the manners described with respect to the various alternate embodiments of FIGS. 1, 2A and 2B described above. According to one example embodiment, the substrate 106 or 206 is the fabric 404 of garment 400 so that the photograph 104 or 204 is sublimated or printed on the garment 400. According to yet another example embodiment, the substrate 106 or 206 is separate from the garment 400, and the badge 102 or 202 is permanently fastened to the garment 400 by stitching, stapling, adhesion or other means. Although such badge is permanently affixed to the garment, it may be removed when the garment is worn out and permanently transferred to another garment. Thus, according to one example embodiment, the fabric 404 of garment 400 is polyester and the photograph 104 or 204 is sublimated or printed on the fabric 404 to form the worker identification badge 402.

Figure 5:
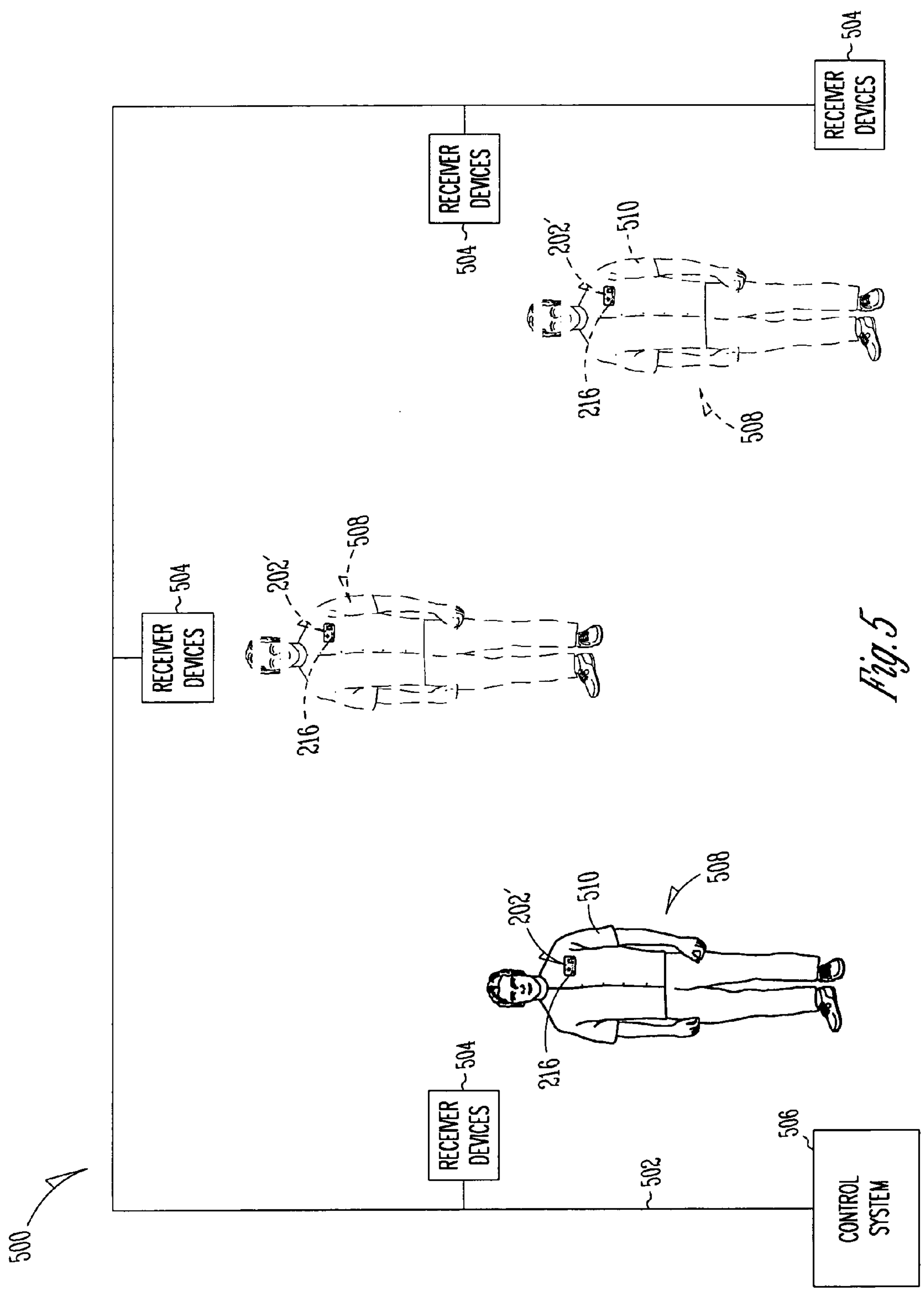
FIG. 5 illustrates various embodiments of the invention in which a method and system is provided for security in a facility.

Referring now to FIG. 5, there is illustrated a security system according to one example embodiment of the invention. As illustrated in schematic form in FIG. 5, a facility 500 includes a security system 502 having one or more receiver devices 504 positioned throughout the facility 500, and a system control system 506 that is configured to receive information from devices 504. According to one example embodiment, security devices 216 are deployed in identification badges 202', as for example illustrated in FIG. 2C, affixed or otherwise included in garments 510 worn by workers 508. In one embodiment, security devices 216 comprises a radio frequency (RF) identification device. Embodiments of the invention are not limited to a particular RF identification device. Examples of the RF identification device include, but are not limited to tags for low frequency applications (including both active and passive tags) and transponders for high frequency applications. Each security device 216 emits a wireless signal, such as a radio frequency (RF) signal, that is received by receiver devices 504. Security devices 216, according to one embodiment, include a battery source and an RF transmitter circuit capable of emitting an RF signal that is detectible by receiver devices 504.

In one example embodiment, a security device 216 emits a signal that can be uniquely identified by the security system 502, and thus correlate a badge 202 with a worker 508 wearing the badge 202. Accordingly, system 502 is capable of tracking the position of a worker 508 in the facility by detecting wireless signals from the corresponding security device 216 and using any one of a variety of known tracking approaches such as triangulation or simply determining which receiver device 504 the worker is nearest based on signal strength. According to still another example embodiment, security devices 216 can receive a wireless signal transmitted by a transmitter of system 502, for example to program the device with a unique code or operational parameters that may be saved in a non-volatile memory. Security devices 216 are advantageously hermetically sealed so that they can be safely put through a washing cycle with a garment 510.

Figure 6:
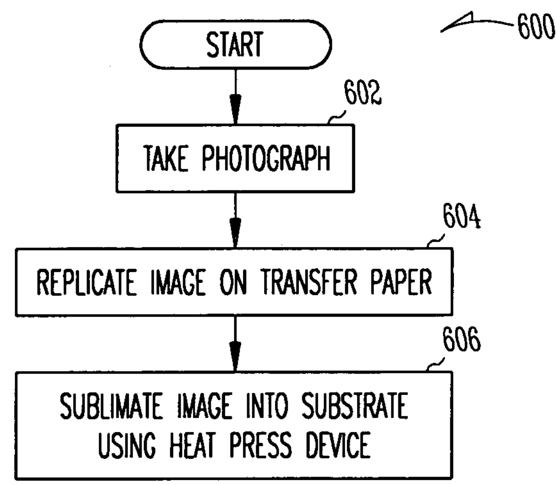
FIG. 6 illustrates an embodiment of the invention wherein a method is provided for obtaining worker identification and preparing badges and garments for use by workers in a facility.

Referring now to FIG. 6 there is illustrated a method according to one embodiment of the invention. As illustrated in FIG. 6, method 600 prepares an identification badge by taking a digital photograph 602 of a worker, replicating the image in a field on transfer paper 604, and sublimating the image into a substrate (106 or 206) using a heat press device 606. In the case where substrate 106 or 206 is part of a separate badge component, the badge with the transfer paper is placed in the heat press. In the case where substrate 106 or 206 is integral with a garment, the badge portion of the garment is placed with the transfer paper in the heat press.

Figure 7:
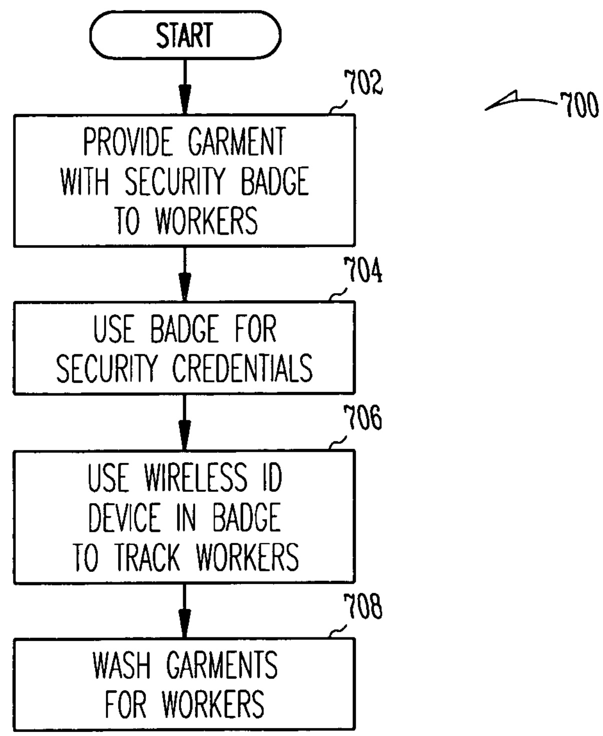
FIG. 7 illustrates various embodiments of the invention in which the security of a facility is ensured using methods according to the present invention.

Referring to FIG. 7 there is illustrated still another method according to an embodiment of the invention. In method 700, a garment having an identification badge with an integral or attached sublimated or printed photograph is provided 702 to workers. The identification badge is then used 704 to provide security credentials for the worker as they move around a facility or are in the field dealing with customers or gaining access to customer dwellings or customer facilities. For example, according to one example embodiment, repair or installation personnel, for instance utility workers or appliance repair workers, are provided company garments with identification badges according to the invention. Customers working with these personnel can therefore gain confidence in their identities by comparing the photograph on the badge on the garment with the person wearing the garment.

According to an alternate embodiment of this method, a security device is provided in the badge, and the security device is used 706 to track the locations of workers in the facility with an electronic security system that can detect wireless transmissions from the security devices. According to still another alternate embodiment, the identification badge garments (with or without security devices) are washed 708 for workers in between working shifts or at other convenient times.

Figure 8:
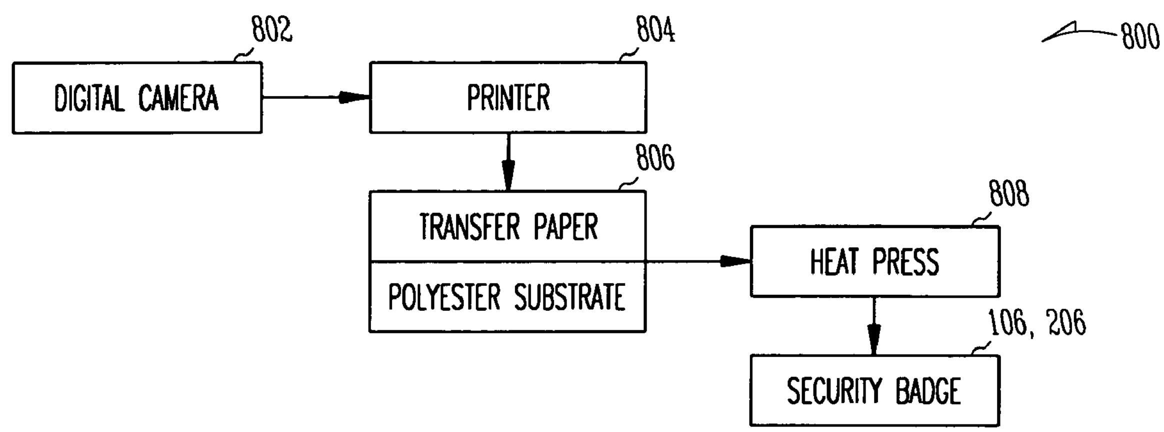
FIG. 8 illustrates apparatus used to make and assemble identification badges according an example embodiment of the invention.

Referring to FIG. 8, there is illustrated in schematic form an embodiment of equipment 800 used to create identification badges according to one example embodiment of the invention. A digital camera 802 captures a photograph of a worker. The digital image is input to a device 804 in order to produce an image field on a transfer paper 806 with the worker's image. A heat press device 808 is used to transfer the image from transfer paper 806 to an identification badge having a polyester substrate in order to create an identification badge according to embodiments of the present invention. According to still another embodiment, more than one field is produced on a transfer paper and multiple images are transferred to multiple badges simultaneously.

According to still another example embodiment, the workers provided a garment with an identification badge according to the present invention are airport maintenance workers, airport restaurant workers or other service providers, and airport security personnel. Furthermore, according to yet another alternate embodiment, security personnel of all types are provided with a garment having an identification badge according to the present invention.

CONCLUSION

Thus there has been described above various embodiments of identification badges, garments, systems and methods according to the present invention. For instance, by providing washable identification badges that are permanently fastened to a garment certain safety health and cleanliness issues are addressed, as well as making the identification badge less prone to be lost or stolen.

The invention claimed is:

1. An article comprising:

a washable garment including a washable identification badge coupled to the washable garment and including a photograph of one and only one worker, the one and only one worker being a person intended to wear the washable garment while working in a facility of a company, the washable identification badge to provide security credentials for the one and only one worker as the one and only one worker moves about the facility;

the washable identification badge including at least two substantially planar and parallel layers of polyurethane material wherein a first one of the planar layers is a first polyurethane layer and the other one of the planar layers is a second polyurethane layer;

the washable identification badge including a security device including a radio frequency (RF) circuit capable of emitting a wireless RF signal, and wherein the security device includes opposite and substantially planar surfaces on opposite sides of the security device;

the security device carried in between the first polyurethane layer and the second polyurethane layer and positioned so that the opposite and substantially planar surfaces are substantially parallel to surfaces of the at least two substantially planar and parallel layers;

the wireless RF signal detectable by one or more receiver devices to correlate the wireless RF signal with the one and only one worker intended to wear the washable garment including the washable identification badge and to identify the security device within the facility;

the washable identification badge including a polyester fabric layer including polyester fiber to carry the photograph of the one and only one worker intended to wear the garment, wherein the photograph is sublimated into the polyester fabric layer so that the photograph becomes substantially indelible, wherein the photograph includes at least a photograph of the one and only one worker's face, the photograph having sufficient detail to allow accurate identification of the one and only one worker by comparison of the photograph to the one and only one worker's face, the polyester fabric and the photograph sublimated in the fabric being washable;

the washable identification badge coupled to the washable garment so that it stays attached to the garment through a plurality of washings of the washable garment; and wherein the identification badge further includes a non-woven fabric element having first and second sides wherein the first polyurethane layer is fused to a first side of the non-woven fabric element with the first polyurethane layer/element positioned between the polyester fabric and the non-woven fabric element so that the non-woven fabric element strengthens and reinforces the polyester fabric substrate and increases durability and the second polyurethane layer is bonded on the second side of the non-woven fabric element to seal the second side of non-woven fabric element and to protect against washing agents during washing of the identification badge.

2. The article of claim 1, wherein the security device further includes a receiver and a non-volatile memory, the receiver operable to receive a transmitted wireless signal including a unique code and operable to save the unique code in the non-volatile memory.

3. The article of claim 1, wherein the security device is hermetically sealed within the washable identification badge so that the security device is operable to be put though a washing cycle with the washable garment and the washable identification badge.

4. The article of claim 1, wherein the washable identification badge includes additional indicia sublimated into the polyester fabric and including a name of the one and only one worker intended to wear the garment, a company name associated with the company, an identification number identifying the one and only one worker intended to wear the washable garment, and a company logo associated with the company.

5. A method comprising:

obtaining a washable garment to be used in a facility by one of a plurality of workers while the one of the plurality of workers is in the facility;

capturing a digital photographic image of the one of the plurality of workers intended to wear the washable garment;

obtaining a digital image of additional information including at least one indicia associated with the facility;

obtaining a washable identification badge, wherein the identification badge includes (a) a polyester fabric substrate having polyester fibers;

(b) a non-woven fabric element having first and second sides;

(c) a first polyurethane layer;

(d) a second polyurethane layer;

(e) wherein the polyester fabric substrate is fused to a first side of the non-woven fabric element with the first polyurethane layer positioned between the polyester fabric substrate and the non-woven fabric element so that the non-woven fabric element strengthens and reinforces the polyester fabric substrate and increases durability;

(f) and further wherein the second polyurethane layer is bonded on the second side of the non-woven fabric element to seal the second side of non-woven fabric element and to protect against washing agents during washing of the identification badge;

(g) a RFID identification tag device positioned between the first and second polyurethane layers and adjacent the non-woven fabric element;

transferring to the washable identification badge an image including the captured digital photographic image of the one of the plurality of workers and the digital image of the additional information by exposing an indelible ink to the polyester substrate, heating the polyester substrate to open a plurality of pores in the polyester fibers of the substrate to allow an ink vapor formed by heating the indelible ink to enter the plurality of pores, and cooling the polyester fibers to encapsulate and trap the indelible ink in the polyester fibers of the polyester substrate to produce a washable identification badge including a plurality of transferred images;

attaching the washable identification badge including the transferred images to the washable garment;

issuing the washable garment including the attached washable identification badge to the one of the plurality of workers;

wearing by the one of the plurality workers the issued washable garment as the one of the plurality of workers is in the facility;

returning the washable garment for washing, the returned washable garment including the attached washable identification badge;

washing the washable garment for the one of the plurality of workers, including washing the attached washable identification badge, including exposing the polyester fibers to a washing agent; and returning the washed washable garment to the one of the plurality of workers for further wearing by the one of the plurality of workers when the one of the plurality of workers is in the facility.

6. The method of claim 5, wherein the polyester fiber substrate is formed of 100% polyester.

7. The method of claim 5, wherein capturing a digital photographic image of the one of the plurality of workers further includes:

inputting the digital photographic image to a device in order to produce an image field on a transfer paper including an image of the one of the plurality of workers.

8. The method of claim 5, wherein transferring to the washable identification badge an image including the captured digital photographic image of the one of the plurality of workers and the digital image of the additional information includes:

placing the transfer paper on the polyester fiber substrate and heating and pressing the transfer paper to sublimate the image field onto the polyester fiber substrate.

9. The method of claim 5, further including using the washable garment including the washable identification badge as a security credential for the one of the plurality of workers as the one of the plurality of workers gains access to and moves around in the facility, wherein after washing the washable garment including the washable identification badge the transferred captured digital photographic image of the one of the plurality of workers retains sufficient detail to allow accurate identification of the one of the plurality of workers by comparing a face of the one of the plurality of workers to the transferred captured digital photographic image of the one of the plurality of workers.

10. A method according to claim 5 wherein the second polyurethane layer is bonded to the non-woven element by heating it and pressing it to the non-woven element.

* * * * *